US008726681B2

(12) United States Patent
Williams

(10) Patent No.: US 8,726,681 B2
(45) Date of Patent: May 20, 2014

(54) METHOD AND SYSTEM OF COOLING COMPONENTS OF A COMPUTER SYSTEM

(75) Inventor: Don P. Williams, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1910 days.

(21) Appl. No.: 11/625,956

(22) Filed: Jan. 23, 2007

(65) Prior Publication Data

US 2008/0173036 A1   Jul. 24, 2008

(51) Int. Cl.
    F25D 23/12   (2006.01)
(52) U.S. Cl.
    USPC ............. 62/259.2; 361/690; 361/691
(58) Field of Classification Search
    USPC ............. 62/259.2, 52.1; 361/691, 690
    See application file for complete search history.

(56) References Cited

U.S. PATENT DOCUMENTS

| 7,565,808 | B2 * | 7/2009 | Sullivan ................................ 62/5 |
| 2005/0225940 | A1 * | 10/2005 | Walters et al. ................. 361/695 |
| 2005/0257533 | A1 * | 11/2005 | Gunawardana et al. ............ 62/5 |
| 2006/0011177 | A1 * | 1/2006 | White ............................ 123/540 |
| 2006/0059937 | A1 * | 3/2006 | Perkins et al. ................. 62/259.2 |

OTHER PUBLICATIONS

Vortec Coolers for Electrical Enclosures, ITW Air Management, www.vortec.com/vortex_coolers.php, (Oct. 28, 2005), pp. 1-2.*

* cited by examiner

Primary Examiner — Cassey D Bauer

(57) ABSTRACT

A method and system of cooling components of a computer system. At least some of the illustrative embodiments are computer systems comprising an enclosure, a motherboard within the enclosure, a heat generating component coupled to the motherboard and within the enclosure, a canister comprising a compressed fluid (the canister coupled to the enclosure), and a gas cooling device selectively fluidly coupled to the compressed fluid (the gas cooling device produces chilled gas when fluidly coupled to the compressed fluid). The chilled gas is directed upon the heat generating component.

7 Claims, 2 Drawing Sheets

US 8,726,681 B2

METHOD AND SYSTEM OF COOLING COMPONENTS OF A COMPUTER SYSTEM

BACKGROUND

Computer systems are used in a diverse array of applications, for example from simple word processing to highly complex three dimensional gaming. With respect to gaming, increased computer system performance translates to more realistic game play. Computer systems used for gaming purposes have, in most cases, high-end main processors and video graphics cards which require large cooling apparatuses. Sometimes computer systems used for gaming are modified to increase performance, such as clocking the main system processor faster than specified for the particular processor (known as "over-clocking").

In order to cool computer system components, particularly over-clocked processors, several after-market cooling systems are available, such as oversized heat sinks, high volume cooling fans, heat pipes (closed loop evaporative cooling) and water cooling systems. However, during times of peak processor utilization, additional cooling may be needed, particularly in computer systems using only cooling fans with heat sinks and/or heat pipes for cooling of computer system components.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
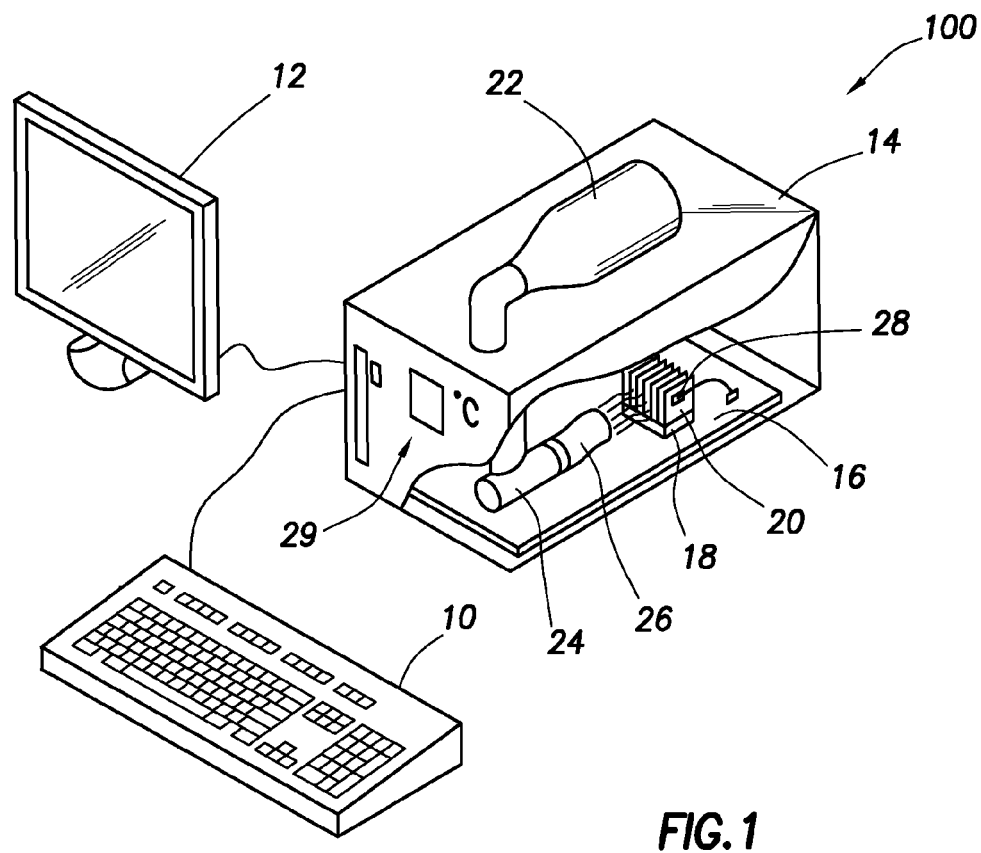
FIG. 1 shows a computer system in accordance with at least some embodiments.

FIG. 1 illustrates a computer system 100 in accordance with at least some embodiments. In particular, computer system 100 comprises a keyboard 10 and monitor 12 coupled to the various computer system components within a case or enclosure 14 (shown in perspective cutaway view). Within the enclosure 14 resides the motherboard 16 to which various heat generating components attach. For example, a processor 18, which executes instructions and generates heat, couples to the motherboard 16. In some embodiments the processor is the main system processor, and in alternative embodiments the processor 18 is the processor on a video graphics card.

In order to help dissipate heat generated by the processor 18, a heat sink 20 is thermally coupled to the processor 18. In some embodiments the heat sink 20 is purely passive, conducting heat away from the processor 19 by way of metallic cooling fins. In other embodiments, the metallic cooling fins are combined with an integrally mounted cooling fan, which cooling fan forces airflow across the cooling fins. In yet still other embodiments, the heat sink 20 may be a "heat pipe" which uses a combination of conductive heat transfer and convective heat transfer (via a gas within a closed loop evaporative cooling system).

Regardless of the precise nature of the heat sink 20, during operation of the computer system 100 there may be periods of time when the processor 18 generates more heat than can be transferred away or dissipated by the heat sink 20, such as when the processor is being over-clocked during aggressive game play. In order to provide additional cooling, and in accordance with embodiments of the invention, the computer system 100 also comprises a burst-type cooling system to aid the primary heat dissipation element for short periods of time (e.g., during critical portions of game play where processor 18 temperature rises quickly).

Still referring to FIG. 1, the burst-type cooling system comprises a bottle or canister 22 coupled the enclosure 14, and in this illustrative case the canister 22 coupled to an exterior portion of the enclosure 14. In alternative embodiments the canister may reside within the enclosure 14. The contents of the canister 22, being a compressed fluid, are selectively fluidly coupled to a gas cooling device 24. The gas cooling device 24 is illustratively shown to couple within the enclosure 14, but in alternative embodiments resides external of the enclosure 14. In yet still further embodiments, the gas cooling device 14 may be integral with the canister 22. As the name implies the gas cooling device 24, by one of various mechanism described below, creates chilled gas. The chilled gas created by the gas cooling device 24 is directed upon the heat generating component which needs additional cooling. For example, a duct system 26 may convey chilled air from a chilled air outlet to the illustrative processor 18 and/or heat sink 20.

Figure 2:
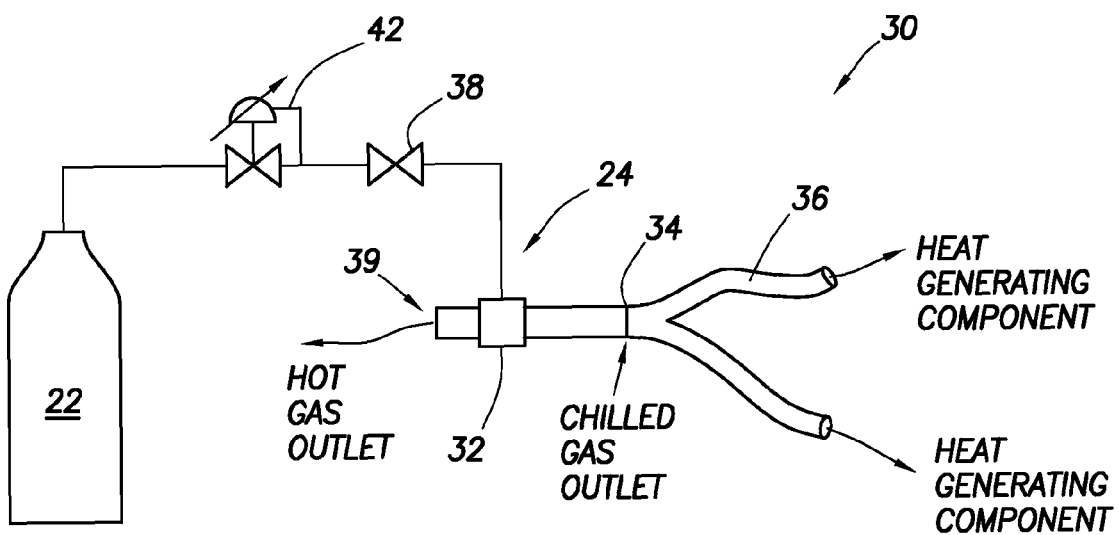
FIG. 2 shows a fluid schematic of a cooling system in accordance with various embodiments.

FIG. 2 illustrates a fluid schematic of the burst-type cooling system 30 in accordance with at least some embodiments. In particular, the burst type cooling system 30 comprises the canister 22 whose compressed fluid contents are selectively fluidly coupled to the gas cooling device 24, here being an illustrative Ranque-Hilsh vortex tube (hereinafter just vortex tube). For a vortex tube, the compressed fluid enters tangentially into a swirl chamber creating a gas swirl at high speed. Cooling takes place in a vortex tube by the splitting of the gas that enters into two streams, with a first stream transferring kinetic energy to a second stream, resulting in separate hot and chilled gas streams. The chilled gas stream exits the vortex cooler 32 by way of a chilled air outlet 34. Vortex tubes are readily available, such as from AirTX International of Cincinnati, Ohio.

Still referring to FIG. 2, the chilled gas exiting the chilled gas outlet 34 is directed upon one or more heat generating components. In some embodiments, the vortex tube 32 is positioned proximate to the heat generating component, and thus the chilled gas is directed to the heat generating component by the vortex tube itself. Other embodiments use a duct system 36 to convey the chilled gas to the heat generating component, and in some cases divide the chilled gas between a plurality of heat generating components.

In embodiments where the vortex tube 32 itself directs the chilled gas on the heat generating components, the vortex tube 32 is mounted at least partially within the enclosure 14 (FIG. 1). In the embodiments where the vortex tube 32 is mounted at least partially within enclosure, the hot gas outlet may protrude from the enclosure, or the hot gas may be released external of the enclosure 14 by way of a duct system. In embodiments where the chilled gas of the vortex tube 32 is conveyed by way of duct system 36, the vortex tube 32 may be at any suitable location internal or external of the enclosure 14.

With respect to embodiments where the gas cooling device 24 is a vortex tube 32, the compressed fluid in the canister 22 may take many forms. In some embodiments using a vortex tube 32 the compressed fluid is compressed air. In other embodiments using a vortex tube 32 the compressed fluid is carbon dioxide, which in compressed form may be liquid. However, any suitable compressed fluid which experiences cooling in a vortex tube may be equivalently used. Moreover, compressed fluids that leave little or no residue, are non-flammable and non-conductive provide better performance and safety.

Still referring to FIG. 2, in order to control the selective coupling of the compressed fluid in the canister 22 to the gas cooling device 24, a valve 38 is used. In some embodiments, selective coupling of the compressed fluid in the canister 22 may be accomplished manually by the user monitoring a temperature of interest. Referring briefly to FIG. 1, the motherboard manufacturer, or the enclosure manufacture, may provide a temperature sensitive element 28 (e.g., thermocouple or resistive thermal device (RTD)) which is placed proximate to the heat generating component. The temperature sensed by the temperature sensitive element may be displayed via software mechanisms on the monitor 12, or may be displayed on a front panel display 29. Regardless of the precise mechanism by which the user determines the temperature of interest, when the temperature reaches a predetermined threshold, the user may trigger flow of compressed fluid from the canister 22 to the cooling device 24, such as by manually triggering the valve 38.

In alternative embodiments, the valve 38 is a solenoid operated valve controlled by software executing in the computer system. In particular, in the embodiments shown in FIG. 1, the temperature sensitive element 28 is electrically coupled to the motherboard 16, and thus the processor 18. A program executing on a processor of the computer system monitors the temperature, and when the temperature meets or exceeds a predetermined threshold, the software triggers a output signal (e.g., from a general purpose output port of bridge device), which in turn actuates the solenoid of valve 38.

The pressure of the compressed fluid in the canister 22 may vary, not only by the type of compressed fluid, but also by the amount of compressed fluid remaining in the canister 22. In some embodiments the flow of compressed fluid from the canister to the gas cooling device 24 is not controlled (other than in an on/off sense). Thus, when canister pressure is high, more compressed fluid may flow than when the canister is almost empty. In alternative embodiments, flow of the compressed fluid from the canister 22 to the gas cooling device 24 is controlled, such as a by a pressure regulator 42. The pressure regulator 42 controls pressure downstream of the regulator to a setpoint pressure, and as such the flow of gas through the gas cooling device 24 is somewhat independent of the pressure of compressed fluid in the canister 22.

Figure 3:
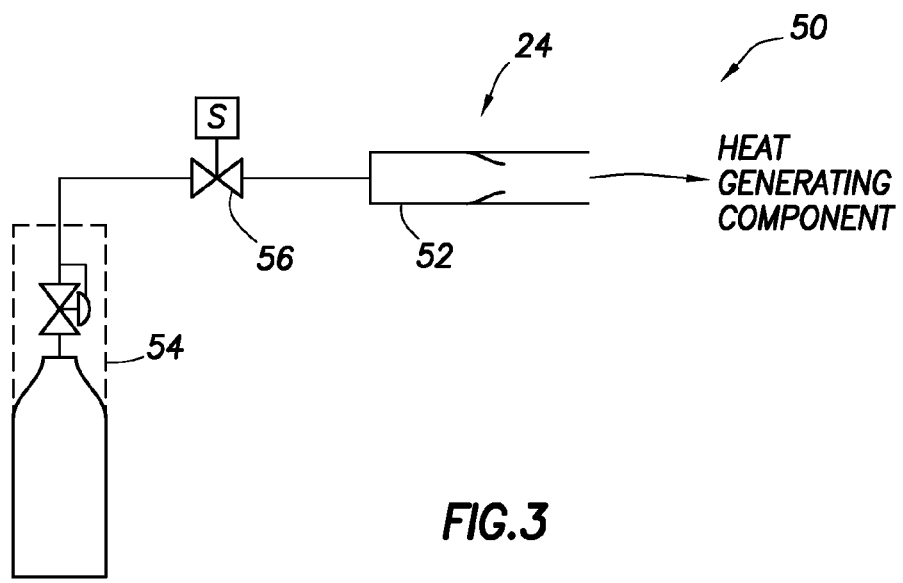
FIG. 3 shows a fluid schematic of a cooling system in accordance with alternative embodiments.

FIG. 3 illustrates embodiments of an alternative burst-type cooling system 50 using a gas expansion orifice 52 (shown in elevational cross-sectional form) as the gas cooling device 24. In particular, the illustrative burst-type cooling system 50 comprises an integral canister and pressure regulator 54. In some embodiments, the pressure regulator and canister are selectively separable, and in other embodiments the regulator is permanently affixed to the canister. While the integral canister and pressure regulator 54 are illustrated with respect to the gas expansion orifice embodiments, the integral canister and pressure regulator may be equivalently used with the vortex tube embodiments.

The compressed fluid within the canister is selectively fluidly coupled to the gas expansion orifice 52 by way of a valve, in these embodiments the valve illustrated as a solenoid operated valve 56. Providing power to the solenoid to trigger compressed fluid flow may be accomplished either manually by the user monitoring a temperature, or electronically by software monitoring a temperature. Compressed fluid flow through the valve 56 (and possibly regulated by the pressure regulator) enters the gas cooling device 24 here being an illustrative gas expansion orifice 52. In particular, the compressed fluid passes through nozzle or orifice, and as the compressed fluid so passes the pressure drops and gas expands. The simultaneous expansion and pressure drop causes a corresponding drop in temperature. Thus the compressed fluid is cooled by the expansion orifice to create a chilled gas stream, which chilled gas is directed upon the heat generating components by either directly positioning of the gas expansion orifice 52, or by way of a duct system.

In embodiments using a gas expansion orifice 52, the compressed fluid may be any fluid that experiences appreciable cooling when expanded through an orifice. In some embodiments, the compressed fluid may be tetraflourethane, which may be the primary ingredient in "canned air" used to clean computer components such as keyboards. In alternative embodiments, the compressed fluid may be air, carbon dioxide or nitrogen. The gas expansion orifice may be placed within the enclosure 14 (FIG. 1) of the computer system 100, or outside the enclosure 14 with the chilled gas directed to the heat generating components by way of a duct system.

In alternative embodiments, the gas expansion orifice 52 may be integral with the canister, and indeed flow of the compressed fluid out of the canister to the attached, lower-pressure tubing (with or without an pressure regulator) may be a sufficient expansion "orifice" to generated desired cooling, particularly in the case of tetraflouroethane as the compressed fluid.

Figure 4:
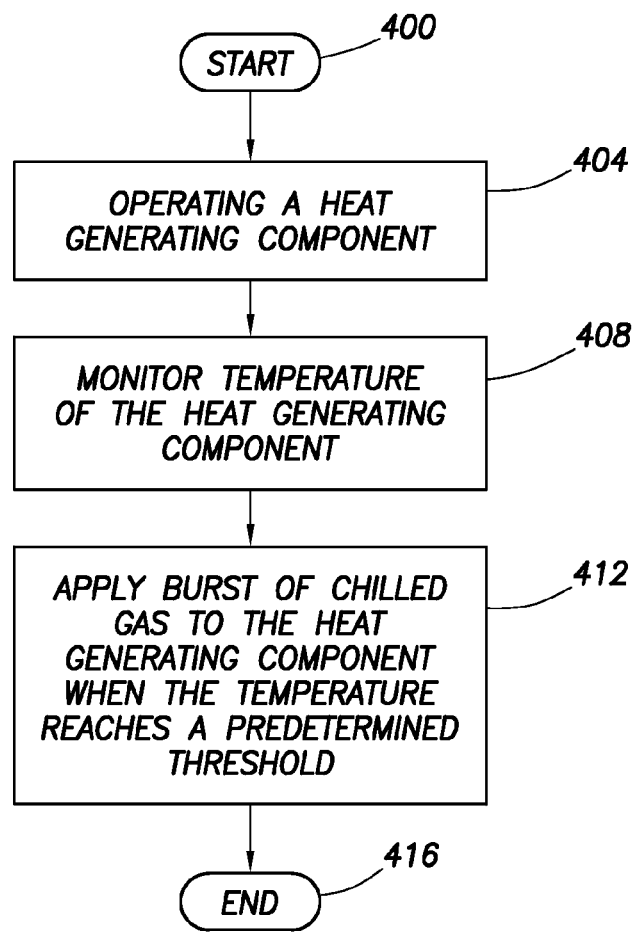
FIG. 4 shows a method in accordance with embodiments of the invention.

FIG. 4 illustrates a method in accordance with at least some embodiments. In particular, the method starts (block 400) and proceeds to operating a heat generating component of a computer system (block 404). The heat generating component may take many forms. In some embodiments, the heat generating component is a main processor of the computer system (e.g., the processor coupled to a heat sink). In other embodiments, the processor is a graphics processor on a graphics card.

Regardless of the precise nature of the heat generating component, the temperature of the heat generating component is monitored (block 408). In some embodiments, the user monitors the temperature, such as by observing a front-panel temperature display or monitoring a temperature displayed graphically on a monitor of the computer system. In other embodiments, the user may be unaware of the monitored temperature, and rather software executing on a processor of the computer system is tasked with monitoring the temperature of the heat generating component. When the monitored temperature reaches a predetermined threshold, a burst of chilled gas is applied directly or indirectly to the heat generating component (block 412) and the process ends (block 416). The burst of chilled gas aids in cooling the heat generating element.

What is claimed is:

1. A computer system comprising:
   an enclosure;
   a motherboard within the enclosure;
   a heat generating component coupled to the motherboard and within the enclosure;
   a canister comprising a compressed fluid, the canister coupled to the enclosure;
   a gas cooling device selectively fluidly coupled to the compressed fluid, the gas cooling device produces chilled gas when fluidly coupled to the compressed fluid;
   wherein the chilled gas is directed upon the heat generating component; and
   a pressure regulator coupled between the canister and the gas cooling device, wherein the pressure regulator selectively regulates a flow rate of gas to the gas cooling device.

2. The computer system as defined in claim 1 wherein the heat generating component is at least one selected from the group consisting of: a main processor; and a processor of a video graphics system.

3. The computer system as defined in claim 1 wherein the canister couples to an exterior surface of the enclosure.

4. The computer system as defined in claim 1 wherein the gas cooling device is at least one selected from the group consisting of: a Ranque-Hilsh vortex tube; and a gas expansion orifice.

5. The computer system as defined in claim 1 further comprising:
   a processor coupled to the motherboard; and
   a temperature sensitive element in operational relationship to the heat generating component, and the temperature sensitive element coupled to the processor;
   wherein the processor monitors the temperature sensitive element, and generates a signal to fluidly couple the compressed fluid to the gas cooling device when a temperature sensed by the temperature sensitive element reaches a predetermined threshold.

6. The computer system as defined in claim 1 further comprising a valve coupled between the canister and the cooling device, wherein an operator of the computer system selectively operates the valve to couple the compressed fluid to the gas cooling device.

7. The computer system as defined in claim 1 wherein the compressed fluid is at least one selected from the group consisting of: air; carbon dioxide; nitrogen; and tetrafluoraethane.

* * * * *

UNITED STATES PATENT AND TRADEMARK OFFICE
CERTIFICATE OF CORRECTION

PATENT NO. : 8,726,681 B2  
APPLICATION NO. : 11/625956  
DATED : May 20, 2014  
INVENTOR(S) : Don P. Williams It is certified that error appears in the above-identified patent and that said Letters Patent is hereby corrected as shown below:

In the Claims:

In column 6, line 9, in Claim 4, delete "Ranque-Hilsh" and insert -- Ranque-Hilsch --, therefor.

In column 6, lines 30-31, in Claim 7, delete "tetraflouraethane." and insert -- tetrafluoroethane. --, therefor.

Signed and Sealed this  
Second Day of September, 2014

Michelle K. Lee  
*Deputy Director of the United States Patent and Trademark Office*